United States Patent Office 3,435,378

Patented Mar. 25, 1969

3,435,378

APPARATUS FOR GENERATING MODULATED WAVES FROM PULSE-TYPE MODULATING SIGNAL

David Robin Birt, Oxted, England, assignor to Communications Patents Limited

Filed Mar. 25, 1966, Ser. No. 537,349

Int. Cl. H03c *1/02;* H03k *7/02*

U.S. Cl. 332—41 10 Claims

ABSTRACT OF THE DISCLOSURE

An amplitude modulation arrangement wherein a modulated output signal is provided by an output stage including two or more electronic switching devices. Switching of these devices is controlled by a train of pulses the widths of individual pulses of which are varied in accordance with a modulating signal such as to produce an output signal whose amplitude varies directly with the amplitude of the modulating signal. The switching devices are operated by low level pulse signals and thus the overall efficiency of the system is high.

This invention relates to systems for generating amplitude modulated electric waves.

Known systems for generating amplitude modulated waves are of two main types, those in which modulation takes place at high level, at a point in the system where the power level approximates that of the output of the system, and those in which modulation takes place at low level, at a point in the system where the power level is low compared with the power level at the output of the system.

The systems of the high level type have the disadvantage that the modulator must be capable of generating sufficient energy to provide the sideband power in the output signal of the system. Modulators capable of providing power at high level and of handling frequencies of modulation etxending over several octaves without the introduction of significant harmonic distortion, are difficult to design.

The systems of the low level type do not have this disavantage, but, as a result of the use of linear amplification to raise the power of the modulated signal to the desired level, the overall efficiency of the low level systems is inferior to that of the high level systems, because of the low efficiency of the final stage or stages providing linear amplification.

Pulse-modification telephony systems are known in which the power output of the system is controlled by a pulse-type modulating signal, the duration of the pulses of which are related to the amplitude of the telephony modulating signal. However, in the known pulse-modulation systems, the output is controlled to have a single power level and the effect of modulation is to control the duration of the output signal correspondingly to the duration of the pulses of the modulating signal.

In contrast to such systems, pulse modulation in a system according to the present invention is effective to control the amplitudes of the output signal correspondingly to a function of the duration of the pulses of the modulating signal.

Accordingly, the present invention provides apparatus for generating amplitude modulated electric waves comprising frequency selecting means, first electronic switching means for controlling the flow of current fed to the said frequency selecting means from a source of supply of direct current, second electronic switching means for providing a conductive path for current circulating in the said frequency selecting means, and pulse signal supply means for supplying signal pulses of variable width connected to control the operation of the said first and second electronic switching means, the width of the pulses supplied being varied correspondingly to the amplitude of a modulating signal, thereby to provide an output signal to a load, by way of the frequency selecting means, which output signal varies in amplitude directly with the amplitude of the modulating signal, the frequency selecting means being tuned to a selected frequency of the series: $f$, $2f$, $3f$ . . . $nf$, where $f$ is the pulse repetition frequency of the pulse signal and $n$ is an integer.

In order that the invention may readily be carried into practice, an embodiment thereof will now be described in detail, by way of exmaple, with reference to the accompanying drawings, in which.

In the system for generating modulated waves to be described, the modulated signal output is provided by an output stage comprising two or more electronic valve or semiconductor devices operated in the switching mode. The switching operations are controlled by pulse type signals, the pulses of which are varied in width by a modulating signal, in a manner to generate an output signal whose amplitude varies directly with the amplitude of the modulating signal. The output valves or semiconductor devices are operated by low level pulse type signals. Hence the system is capable of high overall efficiency of operation.

Figure 1:
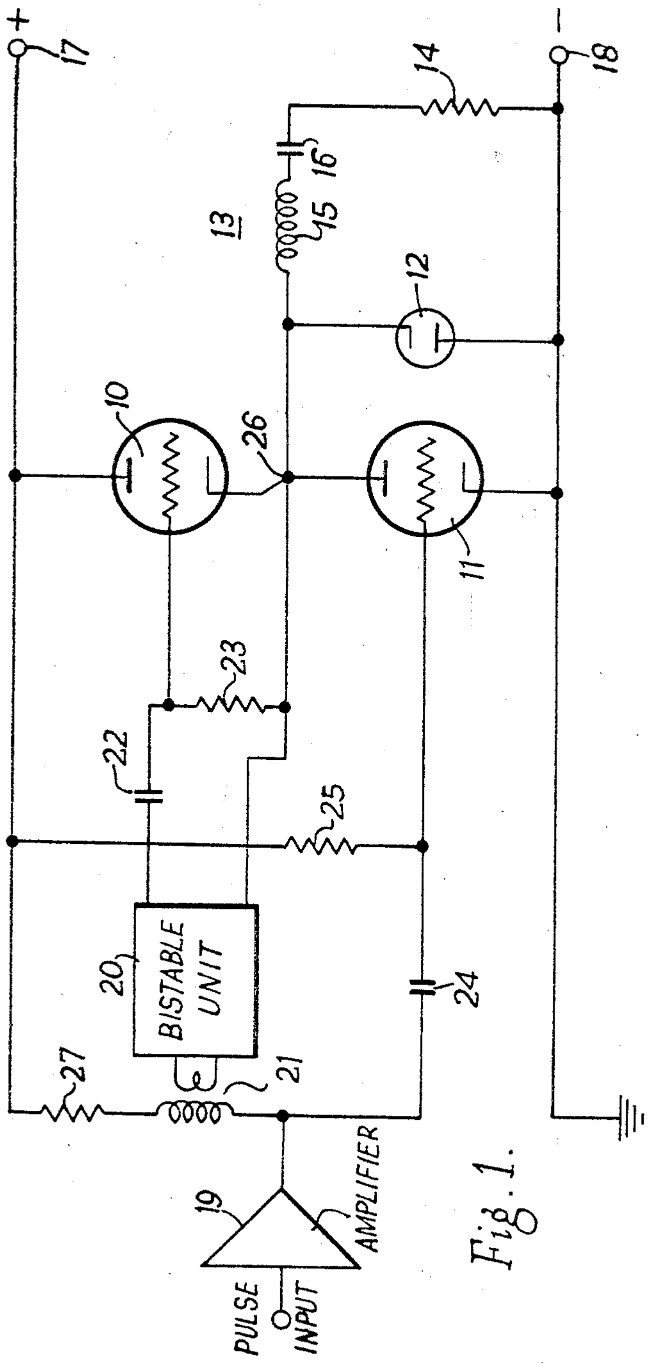
FIGURE 1 is a simplified circuit diagram of the output stage of a pulse operated system for generating amplitude modulated electric waves.

In FIGURE 1 the output stage of the system comprises triodes 10 and 11, a diode 12 and a resonant circuit 13, connected to feed one end of a load resistor 14. The tuned circuit 13 is formed by an inductor 15 and a capacitor 16 connected in series.

The anode of the valve 10 and the cathode of the valve 11 are connected to the terminals 17 and 18, representing a source of supply of direct current in the drawing. Terminal 17 is the positive pole of the source of supply and terminal 18 is the negative pole. The cathode of the triode 10 is connected to the anode of the triode 11 and to the indctor 15. The other end of the load resistor 14 is connected to terminal 18. The triode 11 is shunted by the diode 12, the anode and cathode of the diode 12 being connected respectively to the cathode and anode of the triode 11.

Pulse signals of variable pulse width and of opposite phase relationship are fed to the grid/cathode circuit of the triode 10 and to the grid/cathode circuit of the triode 11. The pulse signal fed to the triode 11 is provided by an amplifier 19 which is supplied with a pulse signal of variable pulse width, generated in a manner which will be described in detail later in this specification.

The pulse signal fed to the triode 10, is provided by a bistable unit 20 by way of a transformer 21. Operating current for the amplifier 19 is provided from the common source of supply connected to terminal 17 by way of the primary of the transformer 21, a resistor 27 being included in series with the primary to avoid pulse distortion due to the inductance of the primary. The bistable unit is triggered by the pulse signal fed to its input, in a manner to provide pulses of the same width as those of the input signal but of opposite phase relationship.

The bistable unit 20 is a multivibrator of conventional design employing two triodes in a cathode coupled arrangement. The anode current for the bistable unit 20 is provided in a manner to enable the connection to the cathode of the triode 10 to be isolated from chassis, for example, by a separate source of supply associated with the unit.

A bistable unit of the kind referred to is described in detail by P. Sayre in "Waveforms," Vol. 19, pages 164–166, M.I.T. series, published by McGraw Hill Book Co. Inc., 1949.

A grid capacitor 22, connected between the output of the bistable unit 20 and the grid of the triode 10, and a resistor 23, connected from grid to cathode, cooperate to provide negative bias, so that the anode current of the triode 10 is cut off during the intervals of time between successive pulses. The pulses are of substantially the same amplitude and of a value such that the triode 10 is rendered substantially fully conductive for the duration of each of the pulses.

The pulses from the amplifier 19 are fed to the grid of the triode 11 by way of a coupling capacitor 24. A resistor 25 connected from the grid of the triode 11 to the terminal 17, provides positive bias so that the triode 11 is conductive during the intervals of time between successive pulses of the input signal.

The pulses are of substantially the same amplitude and of a value such that the triode 11 is driven to cut-off and is rendered substantially nonconductive for the duration of each of the pulses.

A pulse type signal can be represented by a Fourier series, the first, second and third terms of which are $$V=Ak+A\frac{2}{\pi}\sin k\pi\cos wt+A\frac{2}{\pi}\tfrac{1}{2}\sin 2k\pi\cos 2wt+\text{ etc.}\quad \text{(I)}$$

where:

V is the instantaneous value of the signal voltage;
A is the pulse amplitude;
$2\pi k$ is the pulse width; and
$w=2\pi f$, where $f$ is the pulse repetition frequency (P.R.F.)

It will be seen from this expression that pulse width and signal voltage peak amplitude are related according to a sine function. Hence, by arranging that the pulse width is varied according to an inverse sine function, it is possible to obtain a linear relationship between a signal controlling pulse width and signal voltage peak amplitude. If the pulse width is varied at a frequency corresponding to the frequency of modulation and the circuit arrangements are such that the signal voltage is dependent on the second term of the Fourier expression, it will be seen that the signal voltage corresponds to that of an amplitude modulated wave, the carrier wave of which has a frequency $f$. The pulse width is varied symmetrically, hence, components due to phase modulation are not generated.

In the circuit arrangement shown in FIGURE 1, the value of the inductor 15 and the capacitor 16 are such that the resonant circuit 13 is tuned to a frequency $f$, corresponding to the P.R.F. of the pulse signals fed to the inputs of the triodes 10 and 11. The reactance resistance ratio Q of the inductor 15 and the load resistor 14 is such that the currents fed to the load resistor are substantially those corresponding to a carrier wave of frequency $f$ and the sidebands produced as a result of modulation.

It is necessary that the triode 11 should be conductive during the intervals of time between the pulses fed to the grid of the triode 10, in order that the flow of current in the tuned circuit and load may not be interrupted for appreciable periods of time in each cycle. In the arrangement described, the anode to cathode path of the triode 11 is conductive, if the polarity of the voltage at the point 26 with respect to chassis is positive. However, during a part of the interval of time in which the triode 11 is conductive, the polarity of the voltage at the point 26 with respect to chassis is negative. Under these conditions a conductive path is provided by the diode 12, the cathode and the anode of the diode 12 being connected to the point 26 and to chassis respectively. In the conductive state, the diode 12 enables the energy stored in the field of the inductor to be transferred to the load resistor 14 and permits a continuation of the flow of sinusoidal current in the load resistor 14.

During the intervals of time when the triode 10 is conductive and the triode 11 is nonconductive, the polarity of the voltages at the point 26 is positive, therefore the diode 12 is nonconductive.

It is desirable that the triodes 11 and 10 are operated to provide a break-before-make switching action in order that the efficiency of the system may not be reduced, since the triode 11, if conductive during the interval of time the triode 10 is conductive, acts to divert energy to waste instead of to the load resistor 14. The desired break-before-make switching action is achieved by adjusting the bistable unit 20 to operate only after the triode 11 has been driven to cut off or beyond cut-off, by a pulse from the amplifier 19. That is to say, when the pulse, which has a finite rise time, has reached a value approaching maximum amplitude.

In the system described, the resonant circuit 13 is tuned to a frequency corresponding to the P.R.F. of the pulse signals fed to the grids of the triodes 10 and 11, so that an amplitude modulated carrier of that frequency is fed to the load resistor 14.

The amplitude of the carrier wave is a maximum when the pulse width corresponds to the period of time of one half cycle of the carrier wave, that is to say when the pulse signals have a mark/space ratio of unity. The amplitude of the carrier wave is reduced to zero if the pulse width is increased to a maximum or is decreased to zero.

An amplitude modulated wave of frequency $2f$, $3f$, etc., may be obtained by arranging that the resonant circuit 13 is tuned to the desired harmonic frequency and by appropriate choice of the pulse parameters. For example, where the desired output frequency is $2f$, in order to vary the modulation from maximum to zero, it is arranged that the pulse is varied in width for values of $k$ in the Equation I, from 0.25 to 0.5 or from 0.25 to zero.

The amplitude of the harmonic diminishes in proportion to its order, that is to say, the second harmonic has a maximum amplitude one half of the maximum amplitude of the fundamental, the third harmonic has a maximum amplitude one third of the maximum amplitude of the fundamental and so on. The anode/cathode resistances of the triodes 10 and 11 constitute a fixed loss in the circuit. Hence, the efficiency will fall off as higher and higher harmonic frequencies are used. Therefore, the system should be designed to work with the fundamental frequency, where maximum efficiency is desired.

The manner in which the pulse signals are generated will now be described in detail with reference to FIGURE 2.

Figure 2:
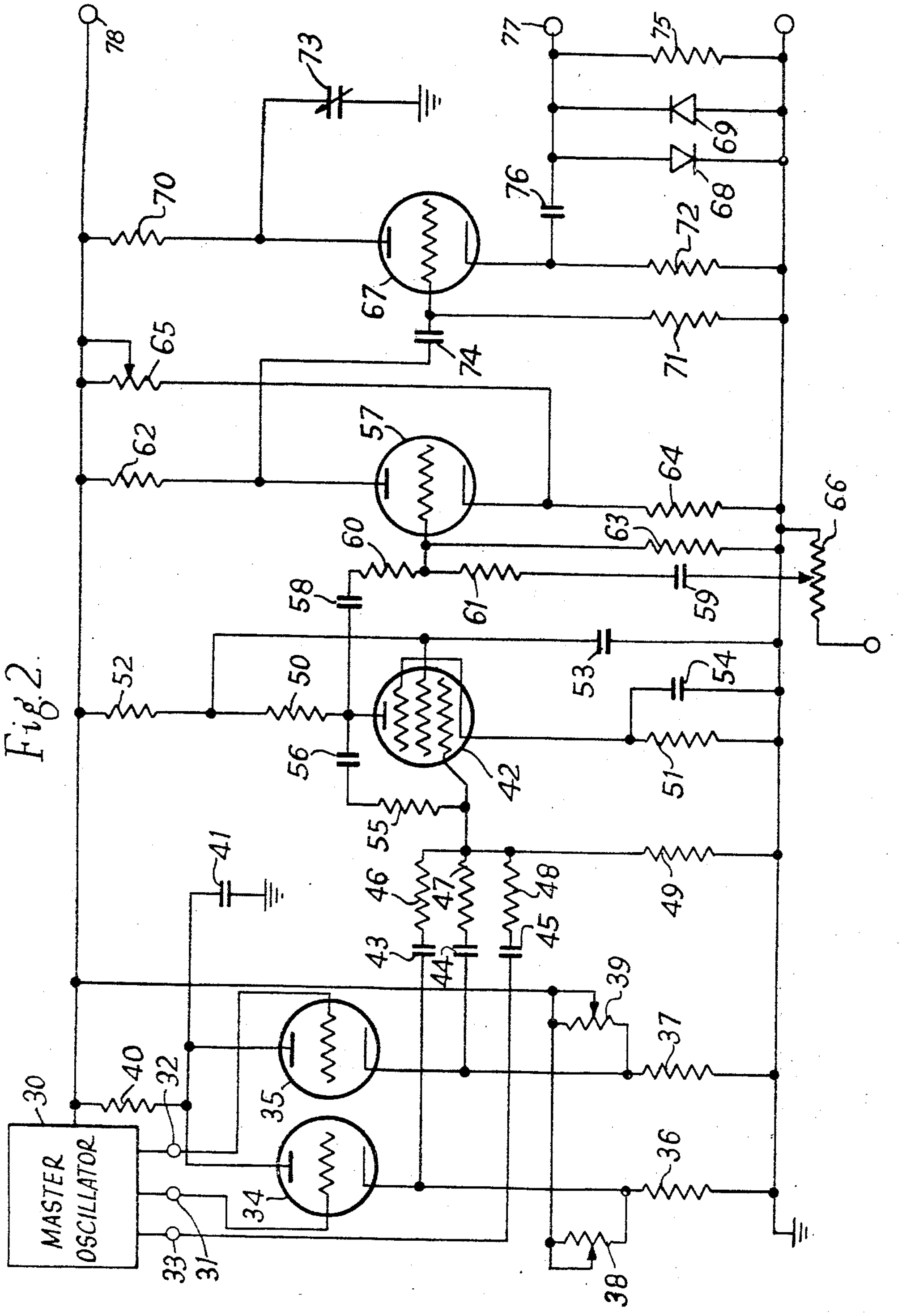
FIGURE 2 is a simplified circuit diagram of a pulse generator by which pulses of variable width are provided for feeding to the output stage of FIGURE 1.

In FIGURE 2 a master oscillator 30 provides push-pull output voltages of sine waveform from terminals 31 and 32 and an output voltage of rectangular waveform from terminal 33. The master oscillator 30 is of conventional design and may include a piezoelectric crystal for controlling the frequency stability of the generated oscillations. Circuit arrangements for generating sinusoidal and rectangular waveforms are described in detail in chapters 4 and 5 of "Waveforms," volume 19 of the M.I.T. series, published by McGraw Hill Book Co. Inc., 1949.

The sinusoidal output voltages from terminals 31 and 32 have phase relationship of 90° and 270° respectively, relative to the phase of the voltage of rectangular waveform from output terminal 33. For this purpose, a phase shifting network, which is not shown in the drawing, is included in the circuit providing the sinusoidal output voltages. In this example, the desired phase relationship between the voltage of rectangular waveform and the two sinusoidal voltages is provided by a network comprising two capacitors connected in series across the output circuit feeding the terminals 31 and 32, with the common terminal of the two capacitors connected to chassis.

The output voltages from terminals 31 and 32 are fed to the grids of triodes 34 and 35 respectively, connected to function as half wave rectifiers and to present a high input impedance across terminals 31 and 32. The rectified output voltages are formed across resistors 36 and 37, connected to the cathode of the triodes 34 and 35 respectively and to chassis.

The cathode resistors 36 and 37 are fed with direct current of positive polarity, by way of variable resistors 38 and 39 respectively, which are adjusted so that the triodes are biased to cut-off and provide the desired rectifying action.

The anodes of the triodes 34 and 35 and the variable resistors 38 and 39 are fed with current from a source of supply, not shown in the drawing, connected to terminal 78 and to chassis. A resistor 40, connected to the terminal 78 and to the anodes of the triodes 34 and 35 and a capacitor 41; connected between the anodes and chassis, provide decoupling and filtering of the anode current supply.

The half cycles of the alternating voltage developed across the cathode resistor 36, the half cycles of the alternating voltage developed across the cathode resistor 37 and the voltage of rectangular waveform provided at terminal 33, are fed to the input grid of a pentode 42 by way of coupling capacitors 43, 44 and 45 respectively and summing resistors 46, 47 and 48 respectively. Associated with the pentode 42 are grid, anode, cathode and decoupling resistors 49, 50, 51 and 52 respectively, and decoupling and by-pass acpacitors 53 and 54 respectively, connected so that the pentode 42 functions as an amplifier in the normal way. To improve linearity and stabilise gain, voltage feedback is provided by a resistor 55, connected to the grid and to the anode by way of a coupling capacitor. The values of the summing resistors 46, 47 and 48 are chosen so that the input voltages have the desired amplitudes.

Figure 3:
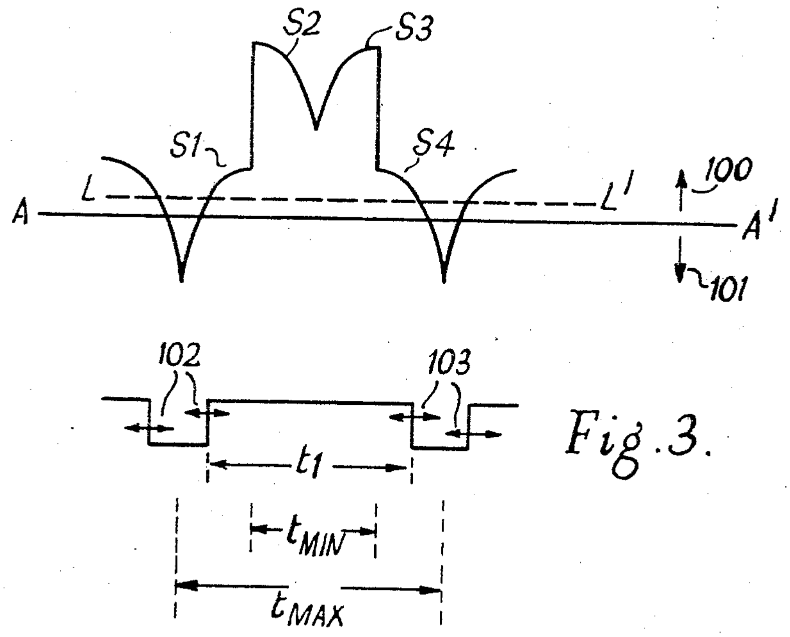
FIGURE 3 is a diagram of certain of the waveforms generated by the pulse generator of FIGURE 2.

The resultant voltage waveform produced at the anode of the pentode 42 is shown in FIGURE 3. In this waveform, which is suitable for use in a system in which the frequency of the output carrier is equal to the P.R.F., quarter sine-waves $S_1$ and $S_2$ are generated by the rectified halfwaves fed to the input capacitor 43 and quarter sine-waves $S_3$ and $S_4$ are generated by the rectified halfwaves fed to the input capacitor 44. The quarter sine-waves $S_2$ and $S_3$ are displaced by the rectangular pulses fed to the input capacitor 45. The manner in which this waveform is compared with a modulating signal to provide a pulse signal in which the pulse width varies with the depth of modulation according to sine function will now be described.

Referring again to FIGURE 2, the composite waveforms and a modulating signal, for example, an audio frequency signal, are fed by way of coupling capacitors 58 and 59 respectively and summing resistors 60 and 61 respectively to the grid of a triode 57, arranged to function as a comparator.

Associated with the triode 57 are anode, grid and cathode resistors 62, 63 and 64 respectively and a variable resistor 65. Direct current of positive polarity is fed to the anode resistor 62 and to the variable resistor 65 from the common source of supply of current connected to terminal 78. The variable resistor 65 is connected to the cathode resistor 64, to enable the bias to be adjusted to a predetermined level, so that the triode is conductive.

In FIGURE 3, the bias level is indicated by the line A–A′. The audio signal level at a particular interval of time is indicated by the broken line L–L′. The level of the audio signal is set so that the maximum amplitude does not exceed the limits represented by the lengths of arrows 100 and 101.

Assuming that the anode current of the comparator triode 51 rises steeply as soon as the combined bias and audio frequency voltages are exceeded and that the output voltage is maintained by limiting action to a value which is substantially constant, then an output pulse of the form shown in the lower part of FIGURE 3 will be generated.

The duration of each pulse may vary from $t$ min to $t$ max, where $t$ min and $t$ max are intervals of time corresponding to depths of modulation of 100% and zero respectively. At the particular instant of time in the audio input cycle, indicated by the broken line L–L′, the duration of the pulse is represented by the interval of time $t_1$. It will be seen that the pulse width is determined by the quarter sine-wave boundaries $S_1$ and $S_4$ of the composite waveform. Therefore, the pulses vary in width symmetrically with the amplitude of the modulating signal, as shown by the double headed arrows 102 and 103, and according to a sine function of the amplitude of the modulating signal.

The limiting action referred to previously is provided by a triode 67 and diodes 68 and 69 connected in the cathode output circuit of the triode.

Associated with the triode 67 in a conventional cathode output pulse amplifying arrangement, are anode, grid and cathode resistors 70, 71 and 72 respectively and an anode bypass capacitor 73. Anode current is supplied to the arrangement from the common source of supply connected to terminal 78.

The voltage pulses from the anode of the comparator triode 57 are fed to the grid of the triode 67 by way of a coupling capacitor 74. The triode 67 has a grid base such that it is driven to cut-off for a part of the duration of each of the input pulses.

Further limiting action is provided by the diodes 68 and 69, connected in opposite senses across an output resistor 75 and to the cathode of the triode 67 by way of a capacitor 76.

As a result of the reduction of the cathode impedance due to the shunting action of the diodes 68 and 69, the output pulses produced across the output resistor 75 are of substantially rectangular form. These pulses are the pulses of variable width required for the operation of the output stage, as already described with reference to FIGURE 1, and are fed to an output terminal 77 to which the input of amplifier 19, FIGURE 1 is connected.

As already stated in the description with reference to FIGURE 1, where it is desired that the output frequency of the signal should be a harmonic frequency of the frequency corresponding to the pulse repetition frequency, the pulse parameters must be chosen accordingly.

For example, where the desired output frequency is $2f$, the pulse generating circuit of the master oscillator 30, FIGURE 2, is adapted to provide a rectangular pulse signal in which each pulse has a width corresponding to a value of $k=0.25$ in the Expression I. That is to say, a pulse signal having a mark/space raito of 1:3. The circuit of the master oscillator 30 is also adapted to provide push-pull outputs of sine waceforms having a frequency of $2f$. The phase relationship with respect to the rectangular wave is such that half waves in alternate cycles of the since wave coincide with the pulses of width $\pi/2$.

The composite waveform is formed by combining the pulse waveform and rectified half cycles of the sine waveform in the manner already described. In the comparator, the composite waveform and the modulating signal are compared, so that the pulse width is determined by the quarter sine wave boundaries $S_1$ and $S_4$ of the composite waveform. The pulses vary in width corresponding to variations in the value of $k$ in the Equation I between 0.5 and 0.25 for depths of modulation of zero and 100% respectively and according to a sine function of the amplitude of the modulating signal.

I claim:

1. Apparatus for generating amplitude modulated electric waves comprising a source of supply of direct current; frequency selecting means including a current circulating path; first electronic switching means for controlling the flow of current fed from the source of supply of direct current to the said frequency selecting means; second electronic switching means and a load included in the current circulating path of the said frequency selecting means; pulse signal supply means, for supplying signal pulses of variable width, connected to the said first and second electronic switching means to control the operation thereof; and means responsive to the amplitude of a modulating signal for varying the width of the pulses supplied to said switching means in accordance with the amplitude of the modulating signal thereby to provide an output signal to the said load, the amplitude of said output signal varying directly with the amplitude of the said modulating signal and the frequency selecting means being tuned to a selected frequency of the series: $f$, $2f$, $3f$ . . . $nf$, where $f$ is the pulse repetition frequency of the said signal pulses and $n$ is an integer.

2. Apparatus as claimed in claim 1, in which the second electronic switching means comprises an electronic switch connected to permit current flow in one sense and further electronic means connected in parallel therewith for permitting current flow in the opposite sense.

3. Apparatus as claimed in claim 2, in which the further electronic means is a diode.

4. Apparatus as claimed in claim 1, in which the first and second electronic switching means are controlled in such manner that the first means ceases to be conductive before the second means becomes conductive and the second means ceases to be conductive before the first means becomes conductive.

5. Apparatus as claimed in claim 4, in which the pulse signal supply means controls one of said first and second electronic switching means by way of a phase reversing bistable unit.

6. Apparatus as claimed in claim 5, in which the pulse signal supply means includes an amplifier which is connected to control the second electronic switching means directly and is connected to control the first electronic switching means by way of said bistable unit.

7. Apparatus as claimed in claim 1, in which the pulse signal supply means includes a pulse signal generator, controlled by a master oscillator which determines said pulse repetition frequency, having means for generating waves of complex waveform combining sinusoidal and stepwise wave portions and comparator means supplied with said complex waveform and a modulating signal for providing pulses of width corresponding to the amplitude of said modulating signal.

8. Apparatus, as claimed in claim 7, in which the master oscillator provides a rectangular waveform at a first terminal and push-pull sinusoidal outputs, respectively in 90° and 270° phase relationship to said rectangular waveform, at second and third terminals, the first terminal being connected to a summing amplifier and the second and third terminals being connected to control half-wave rectifiers, the outputs of which are connected to said summing amplifier, the complex waveform being provided by the summing amplifier.

9. Apparatus as claimed in claim 8, in which the half-wave rectifiers are triode devices, the said second and third terminals of the master oscillator being connected respectively to the control electrodes thereof.

10. Apparatus as claimed in claim 8, in which the comparator means is a triode device having coupling capacitors and summing resistor input arrangements to the control electrode thereof respectively for the complex waveform and modulating signal inputs thereto.

References Cited

UNITED STATES PATENTS

| | | | |
|---|---|---|---|
| 1,564,627 | 12/1925 | Round | 332—1 |
| 2,968,010 | 1/1961 | Case | 332—41 |
| 3,181,074 | 4/1965 | Cotterill | 307—264 X |
| 2,952,812 | 9/1960 | Klein et al. | |

ALFRED L. BRODY, *Primary Examiner.*

U.S. Cl. X.R.

332—9, 31; 328—61, 27, 117; 307—265, 264